Feb. 24, 1925.

B. HILDEBRAND

CABLE ADJUSTING MECHANISM

Filed April 2, 1924

1,527,550

INVENTOR
BUD HILDEBRAND
BY
R. W. Smith
ATTORNEY

Patented Feb. 24, 1925.

1,527,550

UNITED STATES PATENT OFFICE.

BUD HILDEBRAND, OF LONG BEACH, CALIFORNIA.

CABLE-ADJUSTING MECHANISM.

Application filed April 2, 1924. Serial No. 703,715.

*To all whom it may concern:*

Be it known that I, BUD HILDEBRAND, a citizen of the United States, residing at Long Beach, in the county of Los Angeles and State of California, have invented certain new and useful Improvements in Cable-Adjusting Mechanism, of which the following is a specification.

This invention is a cable adjusting means particularly adapted for use in connecting cables to the cross arms of pump rod turning mechanism such as set forth in U. S. Patent No. 1,417,858, May 30, 1922; but also adapted for general use in connecting cables to either rigid members or other cables and the like.

It is the object of the invention to provide a device so constructed that a cable may be rigidly fixed to one end thereof, with the opposite end of the device adapted for ready attachment to any suitable member, the mechanism including means whereby the cable may be adjusted with relation to the member to which the device is connected.

It is a further object of the invention to provide an extremely simple but strong and durable mechanism having adjusting means arranged for convenient manipulation thereof and so constructed as to provide for readily and positively locking the same at any desired adjustment.

The invention will be readily understood from the following description of the accompanying drawings, in which.

Figure 1:
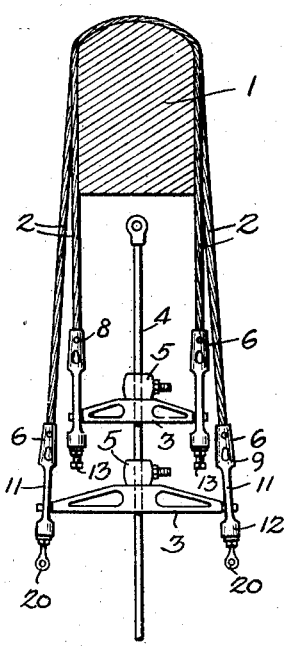
Fig. 1 is a front elevation showing the adjustable cable connections employed for connecting the cables to the cross arms of pump rod turning mechanism.

In the form of the invention illustrated in Fig. 1 the adjustable cable connections are used for connecting the cables to the cross arms of a pump rod turning mechanism such as described in U. S. Patent No. 1,417,858, the pumping mechanism including walking beam 1, having twisted cables 2 received over the same with the ends of the respective cables connected to opposite ends of the respective cross arms 3 which are slidably mounted on the polished rod 4 of the sucker rod for a well pump, said cross arms impinging against the clamps 5 which are adjustably fixed on the polished rod.

The polished rod is reciprocated for operating the pump by movement of the walking beam in usual manner, and at the same time the polished rod is rotated by the twisting tendency imparted to the cross arms 3, due to the rigid connection between the ends of the twisted cables and said cross arms, as fully set forth in the above mentioned patent.

The adjustable cable connection forming the subject matter of this application, provides the necessary non-rotating connection between the cable ends and the cross arms of a pump rod turning mechanism as described, and at the same time permits of longitudinal adjustment of the cable ends relative to the cross arms, while the mechanism is in operation, thereby eliminating the necessity for shutting down the pump when making adjustments.

The cable connection comprises a member 6 adapted to rigidly engage the end of a cable, and illustrated as provided with a longitudinal bore 7 in one end thereof, with transverse tapering openings 8 and 9 preferably communicating with said bore and extending through said member, the lower opening 9 being preferably of restricted area toward its upper side and adapted to receive the knotted end of a twisted strand cable 2 which extends outwardly through bore 7.

The cable may be fixed in position relative to the connecting member 6 by filling bores 7, 8 and 9 with Babbit metal 10 or the like around the cable end, the opening 8 and 9 permitting escape of air as the metal is poured into bore 7, and said metal when hardened firmly holding the cable end in bore 7 and against either longitudinal or turning movement relative to member 6.

The opposite end of member 6 is adapted for longitudinally adjustable connection to any desired member, and for this purpose is bifurcated as shown at 11, said bifurcation terminating in a boss 12 connecting the same and longitudinally alining with the socket end of member 6.

Figure 2:
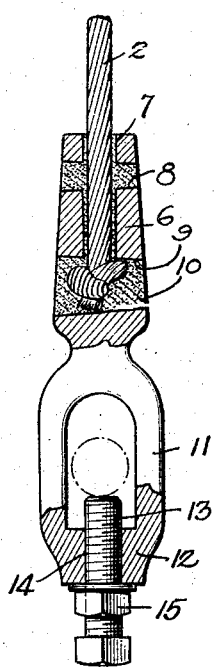
Fig. 2 is a vertical section through one of the adjustable cable connections.

In the type of connecting member illustrated in Figs. 1 and 2, as employed for connecting a cable to the upper of cross arms 3 of the well rod turning mechanism, a bolt 13 is threaded through boss 12 as shown at 14, so that the end of said bolt will extend between bifurcations 11, and a lock nut 15 is threaded onto the bolt beyond boss 12, for impingement against the latter so as to lock the bolt in longitudinally adjusted position with relation to member 6.

Figure 3:
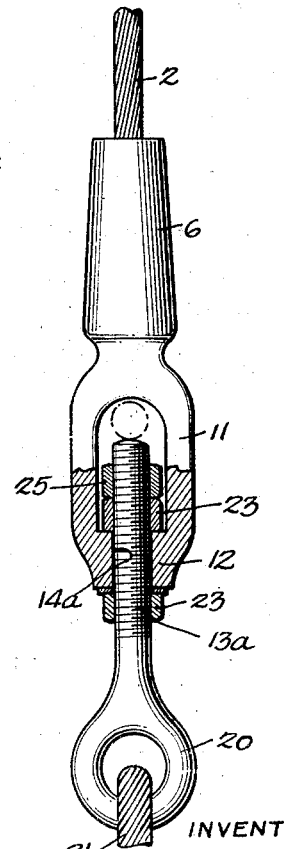
Fig. 3 is a side elevation, partly broken away, showing a modified form of the adjustable cable connection.

Fig. 3 illustrates a form of the invention of general utility for connecting two cables, and also preferably employed between a cable 2 and the lower of cross arms 3 of the mechanism shown in Fig. 1. In this construction a bolt 13$^a$ is slidably mounted in the bore 14$^a$ of boss 12, so that said bolt is free to turn relative to member 6. The outer end of the bolt forms an eye 20 to which a cable 21 may be connected in any usual manner, and bolt 13$^a$ with cable 21 connected thereto is longitudinally adjustable with relation to member 6, by means of nuts 23 threaded on said bolt at opposite sides of boss 12. A lock nut 25 may be also threaded onto the bolt so as to impinge against one of the adjusting nuts 23.

By this construction cable 21 may be adjustably connected to the cable which is rigidly fixed to member 6, by turning nuts 23, while permitting free turning movement of said cables relative to one another, through the swivel connection formed between member 6 and bolt 13$^a$.

When using the adjustable cable connections with the mechanism illustrated in Fig. 1, the ends of cross arms 3 are received through the bifurcated ends of members 6 so as to rest upon the ends of bolts 13 or 13$^a$, as shown in dotted lines in Figs. 2 and 3; the members 6 being thus fixed against turning movement relative to the cross arms by the impingement of the latter against the bifurcations 11, and said cross arms being adapted for longitudinal adjustment with relation to cables 2, by turning bolts 13 and locking the same by means of nuts 15, and turning bolts 13$^a$ and locking the same by nuts 25.

The adjustable cable connection as thus described is adapted for a great variety of uses by varying the shape of member 6 and providing bolt 13 or 13$^a$ with any desired head, in order to connect a cable to any desired member, which may be either a rigid support or a flexible member such as another cable.

It will be apparent that various changes may be made in the construction, combination, and arrangement of parts as thus described, without departing from the spirit of the invention.

What is claimed is:

1. The combination with a member adapted to be rotated, of twisted strand supporting means for said member, connecting means between said supporting means and said member at opposite sides of its axis of rotation, said connecting means being adapted to hold said supporting means against turning movement relative to said member, means for adjusting said connecting means so as to longitudinally adjust said supporting means relative to said member, and means for tensioning said supporting means to cause relative twisting of the same and rotation of said member.

2. Means for connecting a cable to a cross arm comprising a member having a socket in one end thereof adapted to receive a cable end so as to fix said cable against turning or longitudinal movement relative to said member, the opposite end of said member being bifurcated and adapted to receive a cross arm between said bifurcations so as to fix said cross arm against turning movement relative to said member and said cable, the bifurcated end of said member terminating in a boss in longitudinal alinement with said socket end of said member, a bolt extending through said boss between the bifurcations of said member and adapted to receive said cross arm against the end thereof, and means for longitudinally adjusting said bolt relative to said boss.

3. Connecting means comprising a member having a longitudinal socket in one end thereof and tapering sockets communicating with said longitudinal socket and extending transversely through said member, a cable end received in said longitudinal socket, a filler in said sockets and around said cable end for fixing said cable against longitudinal or turning movement relative to said member, the opposite end of said member being bifurcated and terminating in a boss connecting said bifurcations, a bolt extending longitudinally through said boss between the bifurcations of said member, and means for longitudinally adjusting said bolt relative to said boss and locking said bolt in adjusted position.

4. Connecting means comprising a member having a longitudinal socket in one end thereof and a socket communicating therewith and extending transversely through said member, a cable end received in said longitudinal socket, a filler in said sockets and around said cable end for fixing said cable against longitudinal or turning movement relative to said member, and a second member having engaging means longitudinally adjustable relative to said first member.

5. Means for connecting a cable to a cross arm comprising a member having a socket adapted to receive a cable end so as to fix said cable against turning or longitudinal movement relative to said member, said member also having an opening adapted to receive the end of a cross arm so as to fix the latter against turning movement relative to said member by abutment of said cross arm against the walls of said opening, and a second member longitudinally adjustable relative to said first member and adapted to support said cross arm.

6. Means for connecting twisted strand supporting means to a rotatable cross arm at opposite sides of its axis of rotation, comprising a member adapted to hold said supporting means against turning movement relative to said cross arm, and a second member longitudinally adjustable relative to said first member and supporting said cross arm.

7. A connection between a rotatable cross arm at opposite sides of its axis of rotation and the respective ends of a twisted strand supporting means adapted to be tensioned, said connection being adapted to hold said supporting means against turning movement relative to said cross arm, and means for adjusting said connection so as to longitudinally adjust said supporting means relative to said cross arm.

8. Means for connecting a cable to a cross arm comprising a member having a longitudinal socket adapted to receive a cable end, a filler in said socket for fixing said cable end against turning or longitudinal movement relative to said member, said member also having an opening adapted to receive the end of a cross arm so as to fix the latter against turning movement relative to said member by abutment of said cross arm against the walls of said opening, and a second member longitudinally adjustable relative to said first member and adapted to support said cross arm.

9. Connecting means for a cable end comprising a member having a longitudinal socket in one end thereof and a socket communicating therewith and extending transversely through said member, said longitudinal socket being adapted to receive the end of a cable, and a filler in said sockets around said cable end for fixing the latter against turning or longitudinal movement relative to said member.

In testimony whereof I have affixed my signature to this specification.

BUD HILDEBRAND.